Jan. 26, 1954
A. H. WILKINSON ET AL
2,667,240
BRAKING APPARATUS
Filed April 5, 1950
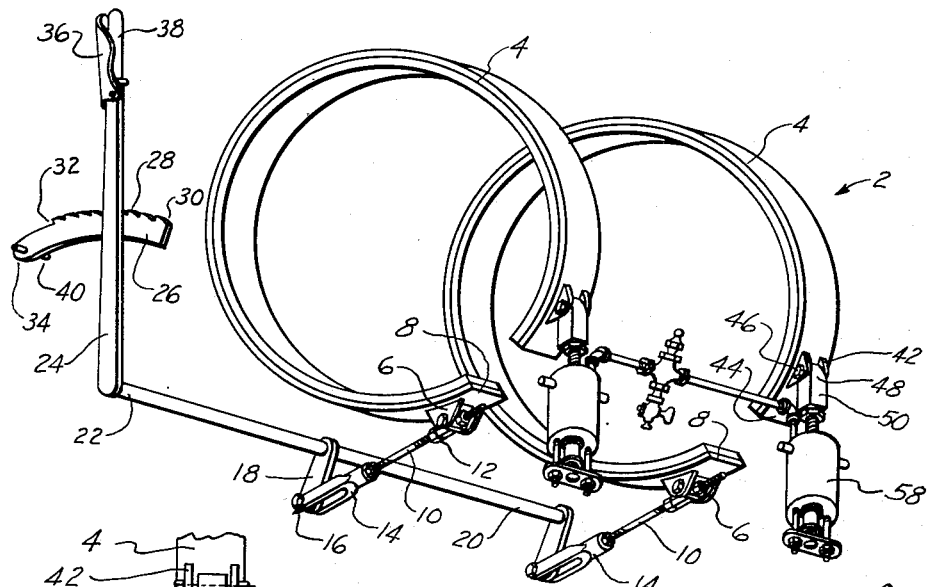
Fig. 1
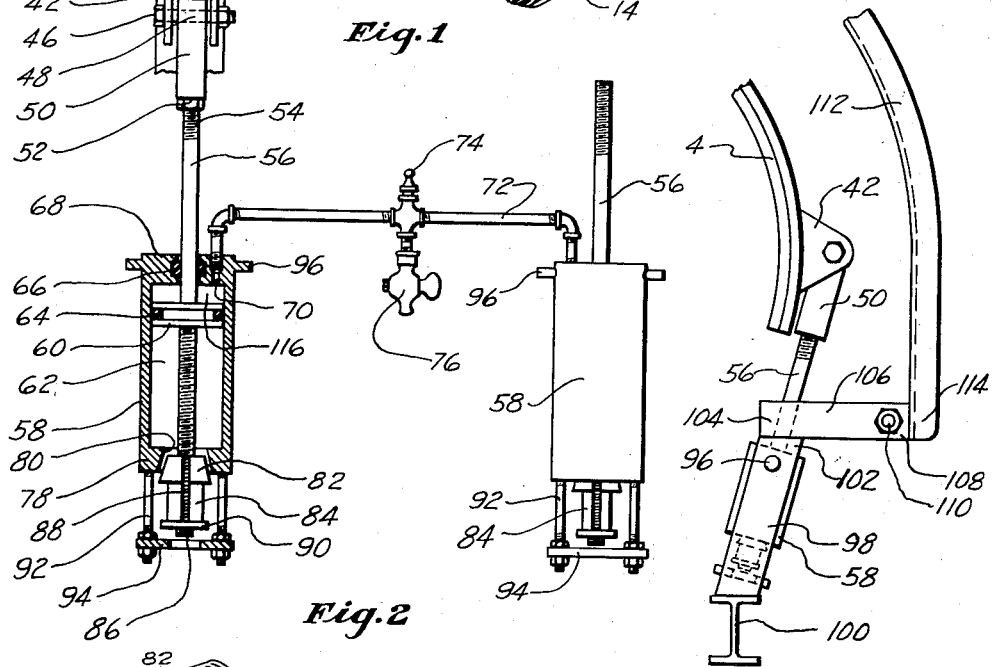
Fig. 2
Fig. 3
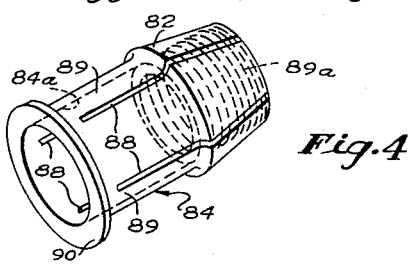
Fig. 4
INVENTORS
A. H. Wilkinson
M. Pallein
BY
C. M. McKnight Patented Jan. 26, 1954

2,667,240

UNITED STATES PATENT OFFICE 2,667,240

BRAKING APPARATUS

Alvin H. Wilkinson and Michael Pallein, Tulsa, Okla., assignors to Franks Mfg. Corporation, Tulsa, Okla., a corporation of Oklahoma Application April 5, 1950, Serial No. 154,073

5 Claims. (Cl. 188—204)

This invention relates to improvements in braking devices and more particularly, but not by way of limitation, to an improved braking device for hoisting drums, and the like.

At the present time a mechanical braking device is generally used for stopping and decelerating hoisting drums such as are used in oil well drilling operations. This type of braking device usually employs two brake bands encircling the hoisting drum, and mechanical linkage interconnecting the bands at one end thereof for equalizing the braking action. The mechanical linkage is necessarily heavily constructed and requires frequent manual adjustment.

The present invention contemplates a braking device having two brake bands for disposal on the periphery of a hoisting drum. The bands are interconnected at one end thereof by a system of levers, and also includes a hand lever for applying an essentially uniform force to each of the bands. The opposite end of each brake band is connected to a hydraulically actuated plunger, and the plunger is disposed in a cylinder secured to a stationary frame. An equalizing conduit interconnects the fluid chambers of the hydraulic cylinders to insure an equal force being placed on the brake bands when the hand lever is actuated. Each of the plungers communicate with an expanding lock or collet nut, which limits the movement of the plungers in the event hydraulic fluid is lost from the cylinders, thereby preventing the brake bands from becoming loose and useless on the hoisting drum, and allowing the drum to turn freely. A brake band support secured to the stationary frame is also provided for each brake band to maintain the bands in correct relationship on the hoisting drum.

An important object of this invention is to provide a braking apparatus for hoisting drums which insures a uniform braking action of the brake bands thereof.

Another object of this invention is to provide a simple and easily adjustable braking device for hoisting drums.

Another object of this invention is to provide a hydraulic braking device for hoisting drums which will prevent the brake bands from becoming loose and useless on the hoisting drum in the event the hydraulic fluid pressure is lost.

A further object of this invention is to reduce the use of cumbersome mechanical linkage on braking devices for hoisting drums and the like.

A still further object of this invention is to provide a lightly constructed braking device for hoisting drums utilized in the oil drilling operations.

Other objects and advantages of the invention will be evident from the following detailed description, read in conjunction with the accompanying drawing, which illustrates my invention.

In the drawing:

Figure 1 is a perspective view of an improved braking device for hoisting drums with the brake band supports removed.

Figure 2 is a side view of the hydraulic unit partially in section for clarity.

Figure 3 is a partial end view of the braking device.

Figure 4 is a perspective view of a novel expandable nut utilized in the hydraulic unit.

Referring to the drawing in detail, reference character 2 designates a braking device generally, having two conventional brake bands 4 arranged in spaced relation around any suitable hoisting drum (not shown), and adapted to engage therewith in braking operation. A bracket 6 is provided on the outer periphery of each of the bands 4 near the actuating end 8 thereof and adapted for connection with a rod 10. The rods 10 are adjustably secured to the brackets 6 by nuts 12, and are threaded at their opposite ends into clevis members 14. Rotatably secured in the forked end 16 of each of the clevis members 14 is one end of a bell crank 18 rigidly secured at its opposite end to a control shaft 20. The control shaft 20 is rotatably supported in suitable bearings (not shown) on the hoisting drum supporting frame (not shown), and is rigidly connected at one end 22 thereof with a vertically extending hand lever 24. Disposed adjacent the hand lever 24 and in a plane parallel to the plane of movement of the lever 24 is a quadrant 26, preferably supported on the hoisting drum supporting frame (not shown). A series of teeth 28 are provided in the upper surface of the quadrant 26 from the rear end 30 thereof to a point 32 in spaced relation to the forward end 34 thereof.

The teeth 28 are adapted to be engaged by a pawl (not shown) rotatably secured on one side of the hand lever 24. A conventional releasing lever 36 is provided on the upper end 38 of the lever 24 connected to the above mentioned pawl by a wire or the like (not shown). A stop pin 40 is provided in the forward end 34 of the quadrant 26 to limit the forward movement of the hand lever 24.

A bracket 42 is provided on the outer surface of each of the brake bands 4 at the opposite or trailing end 44 thereof, and is adapted to receive a pin 46 for securing one end 48 of a link 50 therein. The opposite end 52 of each link 50 is adapted to receive the threaded end 54 of a plunger rod 56 which extends into a hydraulic cylinder 58 (Fig. 2). Rigidly secured on each plunger rod 56 is a piston, or plunger 60 disposed in a cylindrical chamber 62 in each of the respective cylinders 58. A sealing ring 64 is provided in the outer periphery of each plunger 60 in sealing contact with the walls of the cylindrical chamber 62, and a sealing ring 66 is provided in each cylinder head 68 in sealing contact with its respective plunger rod 56. Each of the cylinder heads 68 is also provided with a threaded aperture 70 for receiving the opposite ends of a flexible equalizing conduit 72. Interposed in the equalizing conduit 72 is a suitable lubrication fitting 74 and a drain valve 76.

The lower end or head 78 of each chamber 62 is provided with a tapered bore 80 (Fig. 2) adapted to receive the upper tapered end 82 of an expandable lock nut 84 shown in detail in Figure 4. The nuts 84 are threaded onto the lower portion 86 of each plunger rod 56, and are provided with a plurality of longitudinal slots 88 disposed in circumferentially spaced relation and extending from the upper tapered end 82 thereof to adjacent a circumferential flange 90 on the lower end thereof. The slots 88 divide the nut 84 into a plurality of expandable fingers 89. Internal threads 89a are provided in a portion of the bore 84a of the nut 84 adjacent the upper end 82 thereof and are adapted to engage the threaded shaft 56 in a contracted position (as shown) of the fingers 89. The remainder of the bore 84a is greater in diameter than the shaft 56 for purposes as will be hereinafter set forth. A pair of diametrically opposed studs 92 extend downwardly from the lower end of each cylinder 58 for securing an apertured plate 94 in spaced relation to the lower end of the cylinders 58 for purposes as will be hereinafter set forth.

Each cylinder 58 is provided with a pair of radially extending pins 96 disposed near the upper end 68 thereof, and secured in a pair of straps 98 extending upwardly from the hoisting drum support frame (partially shown at 100, Fig. 3) for supporting the cylinders. The upper ends 102 of the straps 98 are secured to the inner ends 104 of a pair of transversely extending supports 106, only one of which is shown. The outer ends 108 of each pair of supports 106 are interconnected by a bolt 110 having a sleeve (not shown) thereon between the supports 106. An arcuate brake band support 112 extends around and is disposed in spaced relation to the outer periphery of each brake band 4 in any manner, and is suitably connected thereto to prevent the bands from flying off the hoisting drum in the event of a failure of one, or both of the bands. One end 114 of each brake band support 112 is welded or otherwise rigidly secured to the above mentioned sleeve (not shown), and the opposite end thereof (not shown) is similarly connected to the hoisting drum frame at the opposite side of the hoisting drum, thereby permitting the supports 112 to be removed separately from the brake bands 4 by simply removing the bolts 110.

*Operation*

To stop or decelerate the hoisting drum, the hand lever 24 is moved forward, or in a direction from the end 30 of the quadrant 26 toward the end 34 thereof. The control shaft 20 and bell cranks 18 are thereby turned in a counterclockwise direction (referring to the end 22 of shaft 20, Fig. 1) to move the clevises 14 and rods 10 in a direction to apply a tangential force to the ends 8 of the brake bands 4, tending to reduce the diameter of the bands 4 for increasing the friction between the bands and the hoisting drum (not shown). The full braking action is obtained when the lever 24 is moved to a position even with point 32 on the quadrant 26. The lever 24 will be maintained in its forward or braking position by the pawl on the side of the lever engaging the teeth 28 on the quadrant 26. To release the brakes, the upper end of the releasing lever 36 is moved toward the upper end 38 of the lever 24, thereby disengaging the pawl from the teeth 28 and allowing the lever 24 to be moved toward end 30 of quadrant 26.

As the tangential force is applied to the ends 8 of the bands 4, the opposite ends 44 thereof are maintained in a relatively fixed position, depending upon the equality of force applied to the ends 8. The tension in the links 50 resulting from the force applied to the ends 8 of the bands 4 is transmitted through plunger rods 56 and plungers 60 to increase the pressure of the hydraulic fluid contained in the upper portions 116 (Fig. 2) of the chambers 62. It is readily seen that if a greater force is applied to the end 8 of one of the bands 4, than is applied to the end 8 of the other band 4, the pressure in the upper portion 116 of the chamber 62 associated with the band 4 having the greater force applied thereto will be greater than the pressure in the similar chamber 116 of the other band having the lesser force applied. Hydraulic fluid will then immediately flow from the high pressure chamber 116 through conduit 72 into the pressure chamber 116 of the band 4 having the lesser applied force to equalize the pressures therebetween. The resulting increased pressure in the previously low pressure chamber 116 will tend to move its respective plunger 60 downwardly for increasing the braking action of its communicating band 4. The braking action of the other band 4 will be slightly reduced by a loss of hydraulic fluid from its respective chamber 116. When the pressure in the chambers 116 are equalized, the braking action of the bands 4 will be equalized.

In any hydraulic system the loss of the hydraulic fluid through a leak in the system is an omnipresent hazard which should be provided for. In the present invention, if the hydraulic fluid in chambers 116 was dissipated for any reason when the hand lever 24 was in a forward position, the plungers 60 would immediately move upward (Fig. 2) to bring the tapered ends 82 of the collet nuts 84 into the tapered bores 80 of the lower cylinder ends 78. Each tapered end 82 would strike the walls of its respective tapered bore 80, thereby pressing the nut 84 tightly into locking engagement with its plunger rod 56, and thus stopping the upward movement of its respective plunger 60.

In such a condition the loss of braking action of the bands 4 caused by the upward movement of the plungers 60 is compensated by movement of the lever 24 from point 32 toward stop pin 40. This distance is sufficient to provide a braking action before lever 24 engages pin 40. And thus, a braking action is safely maintained even with a loss of fluid.

When the plungers 60 are again moved downward by replacement of hydraulic fluid in the system, and particularly above the pistons 60, the shoulders 90 on the collet nuts 84 will strike the apertured plates 94 to prevent further downward movement of the nuts. It will then be noted that the tapered heads 82 will be removed from the respective bores 80, thereby freeing the fingers 89 for outward movement as will now be set forth. Upon the continuation of a downward force on the plunger rods 56 the threads thereon will exert a downward force on the threads 89a. Thereupon the fingers 89 will momentarily spring outward or expand to momentarily disengage the threads 89a from the respective threaded rod 56. Since the remainder of the bore 84a of each nut 84 is greater in diameter than the respective rod 56, the rods 56 will be allowed to move downward through the nuts 84 to lower the plunger 60 in the cylinders 62. The fingers 89 will spring outward each time a row of the threads on the rods 56 move by a row of the threads 89a and will then immediately spring inward to bring the threads 89a into engagement with the respective threaded rod 56. Therefore, the nuts 84 will be sufficiently engaged with the rods 56 for subsequent upward movement simultaneously with the rods 56 as previously set forth and enter the respective tapered bore 80. The walls of the tapered bores 80 in effect squeeze the fingers 89 inwardly into tight locking engagement with the respective rods 56 to preclude further upward movement of the nuts 84 and rods 56.

A sufficient quantity of hydraulic fluid is maintained in the chambers 116 to maintain the plungers 60 a greater distance from the cylinder heads 68 than the maximum distance which the collet nuts 84 will move, in order to provide sufficient room for movement of the plungers 60 when the pressure in chambers 116 are balanced as explained above. Hydraulic fluid may be added to the chambers 116 through the lubrication fitting 74 and withdrawn through the drain valve 76.

From the foregoing, it will be apparent that the present invention contemplates a braking apparatus adapted to be utilized with a hoisting drum or the like, wherein the brake bands encircling the drum are mechanically actuated into engagement therewith; however, the braking action is hydraulically equalized through the inclusion of a hydraulically actuated piston disposed in a cylinder adjacent each of the brake bands. Furthermore, in the event of any loss of the hydraulic fluid, the braking action is still maintained by the utilization of an expandable locking means cooperating with the hydraulic cylinder to limit the movement of the piston in its relation with its respective brake band.

Changes may be made in the combination and arrangement of parts as heretofore set forth in the specification and shown in the drawing, it being understood that any modification in the precise embodiment of the invention may be made within the scope of the following claims without departing from the spirit of the invention.

We claim:

1. In a braking device for a hoisting drum comprising a plurality of brake bands arranged in a spaced relation and encircling the drum, control means providing a tangential force to one end of the brake bands to cause engagement thereof with the drum, a cylinder disposed adjacent each brake band and having a plunger rod connected with one end thereof, a plunger secured on each plunger rod and responsive to hydraulic fluid pressure in the cylinder for movement therein, flexible conduit means interconnecting the cylinders to equalize the braking action of all the bands in braking position on the drum, expandable locking means disposed on each of the plunger rods and operable in one position to provide for movement of the plunger in one direction, and said locking means operable in another position for limiting the movement of said plunger in a direction opposite from that of the first mentioned direction.

2. In a braking device for a hoisting drum comprising a plurality of spaced brake bands encircling the drum, manually actuated control means providing a tangential force simultaneously to one end of all the bands to cause an engagement thereof with the drum, a cylinder disposed adjacent each band, said cylinders each having a plunger rod extending therefrom and connected with one end of a band, a piston secured on each of the plunger rods and responsive to hydraulic fluid in the cylinder for movement therein, expandable locking means carried by each of the rods, a tapered aperture provided in one end of the cylinder, tapered means on the expandable means adapted to engage the tapered aperture by movement of the piston in one direction to cause a locking of the expandable means against the rods, whereby further movement of the piston is precluded.

3. In combination with a hoisting drum for an oil drilling rig, a braking apparatus comprising a plurality of brake bands arranged in spaced relation and encircling the drum, manually operable mechanical means connected with one end of the bands for applying a tangential force to cause actuation of the bands into engagement with the drum, a hydraulic cylinder operatively associated with each band and having a plunger connecting to one end thereof, means providing communication between the plurality of cylinders for equalizing the braking action of said bands in braking position, and expandable locking means carried by the cylinder and responsive to movement of the plunger to limit further movement of the plunger in the event of hydraulic fluid dissipation in the cylinder.

4. In a braking device for a hoisting drum, comprising a pair of brake bands arranged in spaced relation around the hoisting drum, manually operable mechanical means to apply a tangential force to the actuating ends of said brake bands, a pair of plunger rods pivotally secured to the trailing ends of the brake bands, a hydraulic cylinder carried by each plunger rod, a plunger secured on each plunger rod and reciprocally disposed in the fluid chamber of the respective hydraulic cylinder, expandable locking means disposed on each of said plunger rods operable in one position for allowing said plungers to move freely in one direction, and operable in a second position for limiting the movement of said plungers in the opposite direction to the first mentioned direction.

5. In a braking device, comprising a plurality of brake bands, manually operable mechanical means providing a tangential force to the actuating ends of the brake bands, a plunger rod connected to the trailing end of each brake band, a hydraulic cylinder operatively associated with each plunger, means to equalize the hydraulic pressure in said cylinders for equalizing the braking action of said brake bands against the drum, plunger means on each rod, and expandable locking means on each of said plunger rods operable in one position to limit the movement of said plungers in one direction and operable in a second position to allow said plungers to move freely in the opposite direction.

ALVIN H. WILKINSON.
MICHAEL PALLEIN.

References Cited in the file of this patent

UNITED STATES PATENTS

| Number | Name | Date |
|---|---|---|
| 1,590,675 | Davis | June 29, 1926 |
| 1,711,886 | Ginter | May 7, 1929 |
| 1,910,805 | MacClatchie | May 23, 1933 |